Aug. 31, 1954
A. P. GLENNY ET AL
2,687,706
DIFFERENTIAL HYDRAULIC SERVOMOTOR
Filed April 11, 1950
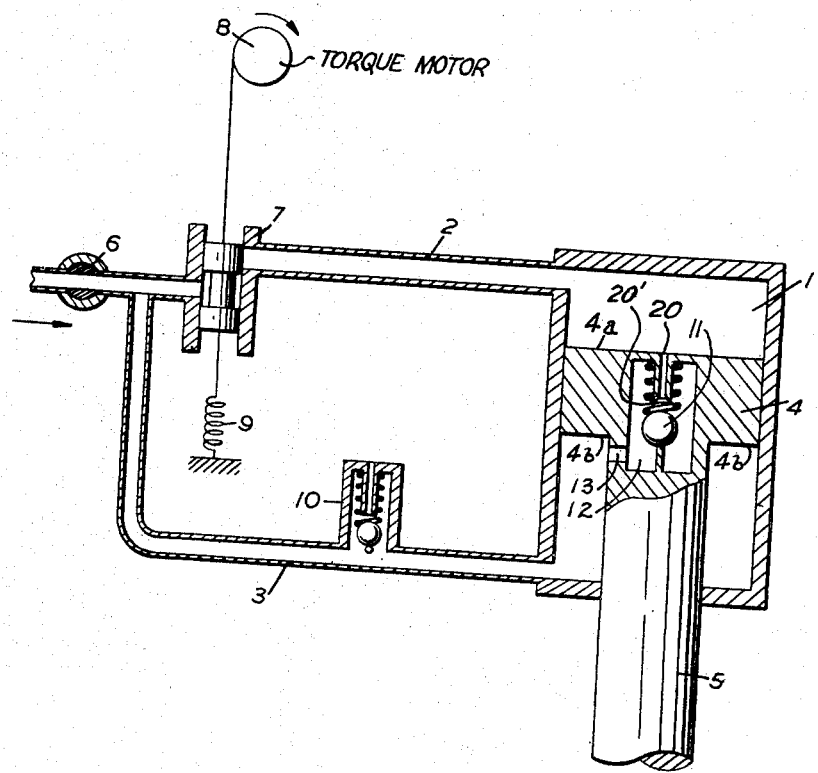
Inventors
ARTHUR P. GLENNY.
DENNIS L. SPENCER.
By Herbert H. Thompson
their Attorney Patented Aug. 31, 1954

2,687,706

UNITED STATES PATENT OFFICE 2,687,706

DIFFERENTIAL HYDRAULIC SERVOMOTOR

Arthur Philip Glenny, Castle Way, Hanworth, and Dennis Lincoln Spencer, West Twyford, London, England, assignors to The Sperry Gyroscope Company Limited, Brentford, England, a company of Great Britain Application April 11, 1950, Serial No. 155,234

Claims priority, application Great Britain April 11, 1949

5 Claims. (Cl. 121—38)

The present invention relates to hydraulic servo-systems comprising a working cylinder and a piston adapted to be translated therein in one direction or the other according to the side of the piston to which the pressure-liquid is applied in the cylinder by means of pressure-liquid supply lines, the piston having a single piston-rod that is attached to one face thereof to provide unequal opposed working areas.

Such a system as that outlined above can be made to operate automatically in response to signals supplied to it through a control valve, for instance by a controlled mechanism, and in an automatic servo-system of this nature it is often desired to change from automatic to what may be referred to as manual control. In order to do this, it is necessary to shut off the supply pressure and open both ends of the cylinder to waste. In hitherto-known systems it has been usual to provide a valve, other than a main supply valve, to connect both ends of the cylinder to waste: it is not sufficient merely to interconnect the two ends because subsequent manual movement of the piston, in the direction towards the larger area thereof, displaces more liquid than can be accommodated in the smaller end, i. e. the end through which the piston-rod passes, so that if the larger end is not opened to waste, the servo is hydraulically locked.

It is the particular object of the present invention to ensure that removal of the supply pressure will enable the servo system to be used under manual control, regardless of the position of the automatic control valve, and without hydraulic lock.

The invention is especially adapted for the hydraulic servomotors of automatic pilots for ships or aircraft in which the automatic control valve is normally controlled from the automatic pilot, but in which it may be necessary to assume direct manual control of the rudder or other control service without interference from the hydraulic system, that is, from hydraulic lock.

Hereinafter, we shall refer to the end of the cylinder through which the piston rod passes as the "small" end and the other end as the "large" end.

According to the invention, a system such as has hitherto been referred to, is characterised by the provision of a waste valve in the supply line to the "small" end of the cylinder, which valve is arranged to open when the main supply pressure is cut off to connect the "small" end to waste, so that the pressure therein falls, and by the provision of a variable leakage path between the two ends of the cylinder which path opens automatically on a fall in pressure in the "small" end.

In a preferred embodiment, the variable leakage path is provided in the piston itself for example by providing the piston with a pressure-controlled valve adapted and arranged to close when the supply pressure is built up and which opens when the pressure in the system falls as a result of the main supply valve being closed.

The valve may take the form of a spring-loaded ball located in the piston head and controlling the flow of pressure-liquid through a channel formed in the piston and piston-rod. Alternatively it may be a piston-ring located in a groove in the piston in such a manner that on rise of pressure in the system the ring moves to seal off communicating ports between the two faces of the piston, and on a fall of pressure in the system it moves to uncover the ports to allow a leakage path by way of the said ports.

In order that the invention may be more readily understood, reference will now be made to the accompanying drawing which shows a schematic arrangement of one specific embodiment thereof, which is given by way of example only.

In the drawing the working cylinder of the system is shown at 1 and to it lead two pressure-liquid supply lines, one shown at 2, to the large end and another, shown at 3, to the small end of the cylinder. A piston 4 and piston-rod 5 are arranged to be translated in the cylinder by pressure applied to one or other side of the piston through the medium of the pressure-liquid introduced through the supply lines. The area of the piston rod 5 in this embodiment is approximately equal to half the area of the face 4a of the piston so that the latter has opposed working surfaces 4a, 4b that are in the approximate ratio of two to one. It will be apparent that the piston will be balanced whenever the pressure on the small end is approximately twice that on the large end. The arrangement is normally used in such a manner that a constant pressure is applied to the small end and varying pressures are applied to the large end through control means to obtain automatic operation of the system.

The two supply lines 2 and 3 are connected to a source of main supply of pressure-liquid controlled by a main supply valve 6 and in the line from the large end there is provided a balanced valve 7 which is operated by a torque motor 8 against spring bias 9. The torque motor 8 is energised, for example, by signals from an automatic control system such as an automatic pilot for ships or aircraft, which is not shown.

Increasing signals to the torque motor 8 are caused to move the balanced valve 7 against the spring bias 9 in such a manner as to admit pressure-liquid to the large end of the cylinder through the line 2 and if this be the upper end, as shown, then the piston 4 is forced down. Decreasing signals to the torque motor 8 cause the valve 7 to move in the opposite direction under the influence of the spring and open the large end to waste via line 2.

In the supply line 3 to the small end, there is provided a waste valve 10 in the form of a spring-loaded ball-valve so loaded as to tend to open it to waste when the pressure drops, that is to say, when the main supply valve 6 is closed, the small normal leakage causes the pressure to drop in the system and valve 10 thereupon opens the small end of the piston to waste.

To engage automatic control, the main supply valve 6 is opened and thus pressure-liquid is supplied to the small end of the cylinder, escaping from the waste valve 10 until the pressure drop and velocity past the ball-valve is sufficient to close the valve against the spring, after which the pressure-rise maintains it closed. As an example, with a main supply pressure of 1,000 lbs./sq. in., the waste valve 10 might be arranged to close at 200 lbs./sq. in.

The piston 4 is provided with a leakage-valve comprising, in this embodiment, a spring-loaded ball 11 similar to the waste valve 10, arranged in the piston and controlling the flow of pressure-liquid in a passage 12, 13 formed in the piston head and adjacent portion of the piston-rod respectively and communicating through small passage 20 with that part of the cylinder that surrounds the piston-rod, i. e. the small end of the cylinder, in effect providing a leakage between the small and large ends thereof.

In the system described, a constant high unit pressure is supplied at the small end of the piston, while the unit pressure at the large end of the piston is normally about one half of the pressure at the small end, the servo control being effected by varying the pressure at the small end above and below the aforesaid mean half pressure by the balanced control valve 7 under the influence of the movement imparted thereto by the torque motor 8. When under automatic control, the uniform high pressure at the low end of the piston keeps the valve 11 closed because when the ball is seated on its seat formed at the end of the pipe 20, the effective area of the ball 11 exposed to the high pressure in passage 12 is greater than the effective area of the ball which is exposed to the pressure at the large side of the piston. This is because the diameter of the first mentioned area is that of the external diameter of the pipe 20, while the diameter of the second mentioned area is equal to the internal diameter of the pipe. Preferably, the ball and the pipe or tube are lapped together to form a seat 20' at the end of the pipe.

To operate under manual control, the main supply valve 6 is closed and the resultant fall in pressure in the system due to normal leakage as the valve remains closed allows the spring biased waste valve 10 and the spring biased piston leakage-valve 11 to open, thereby opening to waste the oil on both sides of the piston 4a. This means that there is a leakage path for pressure liquid past the piston and to waste so that manual control is easily effected.

It is obvious that instead of a by-pass valve 11 and passage 20 in the piston head, other by-pass means may be provided within the scope of this invention as long as a leakage path past the piston is provided so that the servo may be operated manually without undue restraint.

It will be understood that the invention has only been described by way of example and that various modifications may be made to the specific details set forth above, without in any way departing from the scope thereof.

What is claimed is:

1. An hydraulic servo-system comprising a working cylinder, a piston slidably positioned within the cylinder, a piston rod secured on one side of the piston and extending out one end of the cylinder in sealed relation thereto, said rod reducing the piston area to substantially one half the area of the opposite side of the piston, a high-pressure hydraulic fluid source, a first hydraulic line connecting said source to the cylinder adjacent the piston rod end thereof, a second hydraulic line connecting said source to the opposite end of the cylinder, a spring-loaded check valve in said first line adapted to open the line to waste when the pressure drops substantially, a balanced valve in the second line, a torque motor secured to the valve for moving it in one direction, a bias spring secured to the valve to move the valve against the torque of the motor, said bias spring moving the valve to open said second line to waste and said motor moving the valve to open said second line to the fluid source, a biased pressure-operated valve in the piston adapted to close when the pressure in the first line exceeds the pressure in the second line, and a main valve connected between the source and the two lines for cutting off the hydraulic fluid, whereby the check valve opens as the pressure drops, thus permitting manual movement of the piston.

2. An hydraulic servo-system comprising a working cylinder, a piston slidably positioned within the cylinder, a piston rod secured to one side of the piston and extending out one end of the cylinder in sealed relation thereto, a high pressure hydraulic fluid source, a first hydraulic line connecting said source to the cylinder adjacent the piston-rod end thereof, a second hydraulic line connecting said source to the opposite end of the cylinder, a spring-loaded check valve in said first line adapted to open the line to waste when the pressure drops substantially, a balanced valve in the second line for connecting the second line either to the source or to waste, a pressure-operated valve in the piston adapted to close when the pressure in the first line exceeds the pressure in the second line, and a main valve connected between the source and the two lines for cutting off the hydraulic fluid, whereby the check valve opens as the pressure drops, thus permitting manual movement of the piston.

3. An hydraulic servo-system comprising a working cylinder, a piston slidably mounted within the cylinder, and having one face thereof of substantially greater effective area than the opposite face, a high-pressure hydraulic fluid source, a first hydraulic line connecting said source to the cylinder adjacent the smaller piston face, a second hydraulic line controllably connecting said source to the opposite end of the cylinder, a valve means in said first line adapted to open the line to waste when the pressure drops substantially, a controlled valve in the second line for connecting the second line either to the source or waste, a valve means in the piston adapted to close when the pressure in the first line exceeds the pressure in the second line and to remain closed until the pressure in the first line falls below working pressure, and a main valve connected between the source and the two lines for cutting off the pressure source of hydraulic fluid, whereby both the valve means in the first line and the valve means in the piston open to permit free manual movement of the piston.

4. An hydraulic servo-motor including a cylinder, a piston slidably received in the cylinder and having one face thereof of substantially twice the effective area of the opposite face, fluid supply lines communicating with opposite ends of the cylinder, pressure-operated hydraulic by-pass means connecting opposite ends of the cylinder and biased to open when the pressure on the small side of the piston drops below a predetermined value, a pressure-operated outlet valve for discharging fluid from the small side of the piston when the fluid pressure drops below a predetermined value, and a main valve for cutting off the supply of high pressure fluid to both ends of the cylinder, whereby said by-passed means and said pressure operated discharge valve open as the pressure drops to permit free movement of the piston.

5. A hydraulic servo control system of the kind in which the hydraulic motor has a working cylinder and a piston having opposing faces of different areas and in which the piston is controlled to move in one direction or the other by connecting the large face of the piston either to a source of supply of pressure fluid or to waste, while the small face remains continuously connected to the source of pressure fluid, characterised by the provision of a waste valve in the supply line to the small end of the cylinder, means for opening the same automatically on failure of pressure in the supply line, a by-pass passage interconnecting the large and the small ends of the cylinder, a by-pass valve therein biassed to open automatically when pressure falls in the small end of the cylinder below working pressure, said valve being so designed as to close when pressure fluid is supplied through the said supply line to the small end of the cylinder.

References Cited in the file of this patent

UNITED STATES PATENTS

| Number | Name | Date |
|---|---|---|
| 2,283,124 | Peterson | May 12, 1942 |
| 2,283,541 | Dodson | May 19, 1942 |

FOREIGN PATENTS

| Number | Country | Date |
|---|---|---|
| 459,433 | Great Britain | Jan. 4, 1937 |